United States Patent
Welin et al.

(10) Patent No.: US 10,785,677 B2
(45) Date of Patent: *Sep. 22, 2020

(54) CONGESTION CONTROL IN A TELECOMMUNICATIONS NETWORK

(71) Applicant: Telefonaktiebolaget LM Ericsson (publ), Stockholm (SE)

(72) Inventors: Annikki Welin, Solna (SE); Mats Forsman, Rönninge (SE); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/079,549

(22) PCT Filed: Feb. 25, 2016

(86) PCT No.: PCT/SE2016/050144
§ 371 (c)(1),
(2) Date: Aug. 23, 2018

(87) PCT Pub. No.: WO2017/146620
PCT Pub. Date: Aug. 31, 2017

(65) Prior Publication Data
US 2019/0075486 A1   Mar. 7, 2019

(51) Int. Cl.
*H04W 28/02* (2009.01)
*H04L 12/851* (2013.01)
(Continued)

(52) U.S. Cl.
CPC ......... *H04W 28/0289* (2013.01); *H04L 47/11* (2013.01); *H04L 47/2483* (2013.01);
(Continued)

(58) Field of Classification Search
CPC ......... H04L 47/10; H04L 47/11; H04L 47/12; H04L 47/17; H04L 47/18; H04L 47/26;
(Continued)

(56) References Cited

U.S. PATENT DOCUMENTS 5,787,071 A   7/1998   Basso et al.
8,411,561 B2  4/2013   Schliwa-Bertling et al.
(Continued)

FOREIGN PATENT DOCUMENTS

WO   2017/146620 A1   8/2017
WO   2017/146621 A1   8/2017

OTHER PUBLICATIONS

Dreibholz T., "An IPv4 Flowlabel Option—draft-dreibholz-ipv4-flowlabel-22.txt," Network Working Group, Internet Draft, Simula Research Laboratory, Jul. 5, 2015, 8 pages.
(Continued)

*Primary Examiner* — Christopher M Crutchfield
(74) *Attorney, Agent, or Firm* — NDWE LLP

(57) ABSTRACT

Congestion control in a telecommunications network, in which a method of congestion control in a transport network is provided. A buffer state of a buffer is monitored by dynamically sampling the buffer such that the sampling rate is adjusted in dependence of the buffer state. Also, a condition indicative of congestion is determined in response to a change of the buffer state exceeding a predetermined limit. In response to determining the condition indicative of congestion, a congestion notification message is created. The created congestion notification message may then be transmitted to a second network node. The second network node may subsequently compensate for a detected congestion on the basis of a received congestion notification message.

16 Claims, 9 Drawing Sheets

(51) Int. Cl.
*H04L 12/801* (2013.01)
*H04L 12/825* (2013.01)
*H04L 12/835* (2013.01)
*H04W 28/14* (2009.01)
*H04W 80/08* (2009.01)

(52) U.S. Cl.
CPC ............ *H04L 47/26* (2013.01); *H04L 47/263* (2013.01); *H04L 47/30* (2013.01); *H04W 28/0278* (2013.01); *H04W 28/14* (2013.01); *H04W 80/08* (2013.01)

(58) Field of Classification Search
CPC ..... H04L 47/29; H04L 47/263; H04L 47/266; H04L 49/506; H04W 28/12
See application file for complete search history.

(56) References Cited

U.S. PATENT DOCUMENTS

| | | | |
|---|---|---|---|
| 2005/0052994 A1 | 3/2005 | Lee | |
| 2008/0198746 A1* | 8/2008 | Kwan | H04L 47/10 370/231 |
| 2009/0052326 A1* | 2/2009 | Bergamasco | H04L 47/10 370/236 |
| 2009/0196177 A1* | 8/2009 | Teyeb | H04B 7/2606 370/231 |
| 2010/0195521 A1* | 8/2010 | Wanstedt | H04L 47/10 370/252 |
| 2011/0080892 A1* | 4/2011 | Cai | H04W 36/0033 370/331 |
| 2011/0164496 A1 | 7/2011 | Loh et al. | |
| 2011/0299389 A1 | 12/2011 | Mau et al. | |
| 2012/0327774 A1* | 12/2012 | Hernandez | H04L 47/30 370/236 |
| 2013/0089101 A1* | 4/2013 | Kamath | H04L 47/2458 370/400 |
| 2013/0155918 A1* | 6/2013 | Singh | H04W 28/06 370/310 |
| 2014/0003242 A1 | 1/2014 | Nadas et al. | |

OTHER PUBLICATIONS

IEEE Std 802.1Qau-2010, "IEEE Standard for Local and Metropolitan Area Networks—Virtual Bridged Local Area Networks, Amendment 13: Congestion Notification," Amendment to IEEE Std 802.1Q-2005, IEEE, Apr. 23, 2010, pp. 1-119.
International Preliminary Report on Patentability for Application No. PCT/SE2016/050144, dated Feb. 6, 2018, 19 pages.
International Preliminary Report on Patentability for Application No. PCT/SE2016/050145, dated Feb. 6, 2018, 23 pages.
International Search Report and Written Opinion for Application No. PCT/SE2016/050144, dated Oct. 31, 2016, 16 pages.
International Search Report and Written Opinion for Application No. PCT/SE2016/050145, dated Oct. 21, 2016, 16 pages.
Decision to grant a European patent pursuant to Article 97(1) EPC, EP App. No. 16709835.9, dated Oct. 17, 2019, 2 pages.
Decision to grant a European patent pursuant to Article 97(1) EPC, EP App. No. 16709836.7, dated Oct. 17, 2019, 2 pages.
Intention to grant for EP Application No. 16709835.9, dated Sep. 20, 2019, 90 pages.
Intention to grant, EP Application No. 16709836.7, dated Sep. 20, 2019, 120 pages.
Non-Final Office Action, U.S. Appl. No. 16/079,540, dated Aug. 22, 2019, 25 pages.
Examiner initiated interview summary, U.S. Appl. No. 16/079,540, dated Feb. 28, 2020, 1 pages.
Notice of Allowance, U.S. Appl. No. 16/079,540, dated Feb. 28, 2020, 9 pages.

* cited by examiner

| 0 | 1 | 2 | 3 |
|---|---|---|---|
| Version | Traffic Class | *PDCP FID / PDCP-GRP-FID / PDCP-MCGRP-FID* | |
| Payload length | | Next Header | Hop Limit |
| Source Address | | | |
| Destination Address | | | |

Figure 4A

| 0 | 1 | 2 | 3 |
|---|---|---|---|
| Type | Length | | |
| | *PDCP FID / PDCP-GRP-FID / PDCP-MCGRP-FID* | | |

Figure 4B

CONGESTION CONTROL IN A TELECOMMUNICATIONS NETWORK

CROSS-REFERENCE TO RELATED APPLICATIONS

This application is a National stage of International Application No. PCT/SE2016/050144, filed Feb. 25, 2016, which is hereby incorporated by reference.

TECHNICAL FIELD

The present disclosure generally relates to telecommunications and, more particularly, to control of congestion in a telecommunications network. More specifically, the present disclosure relates to systems, methods, nodes, and computer program for congestion control in a transport network.

BACKGROUND

It is a well-known fact that telecommunication networks utilizing resources shared between the users may experience congestion. Congestion may, for example, occur when the sum of traffic of an ingress node of the shared resource exceeds the sum of the traffic of an egress node of the same shared resource. A typical example is a router with a specific number of connections. Even if the router has processing power enough to re-route the traffic according to an estimated link throughput, a current link throughput might in fact restrict the amount of traffic that the outgoing links from the router can cope with. Hence, as a result, the buffer(s) of the router may build up and eventually overflow. The network then experiences congestion and the router may also be forced to drop data packets.

The normal behavior for any routing node is to provide one or more buffers that can manage a certain amount of variation in input and/or output link capacity and hence absorb minor congestion occurrences. However, when the congestion is severe, the routing node will eventually begin to drop data packets.

Transmission Control Protocol (TCP) is a connection-oriented, congestion-controlled and reliable transport protocol. For TCP traffic, a dropped data packet will typically be detected by the sender since no acknowledgment (ACK) is received for that particular data packet and a re-transmission of the data packet will occur. Further, the TCP protocol has a built in rate adaptive mechanism which will lower the transmission bit-rate when data packet losses occur and re-transmissions occur on the Internet Protocol (IP) layer. Hence, TCP is generally speaking well suited to respond to network congestion.

SUMMARY

The present disclosure recognizes the fact that current studies of the fifth generation of telecommunication networks (also known as 5G) describe a midhaul as part of the Radio Access Network (RAN) architecture. As will be appreciated, embodiments described throughout this disclosure relate to, but are not necessarily limited to, congestion control in this midhaul. The mix of different link speeds in the network may introduce rate mismatch. Furthermore, congestion may be caused by the aggregation of traffic from many sources. Additionally, or alternatively, congestion may be caused due to differences in speed between the various network links. For example, congestion may occur when the demand for network resources exceeds the available resources at some point of time in the network. As will be appreciated, too much traffic may create buffer overflow and data packet loss in the various network nodes and in the midhaul.

The present disclosure recognizes that existing solutions have tried to cope with similar problems in earlier generations of telecommunication networks (e.g., 2G, 3G and 4G). However, this disclosure additionally recognizes that the existing solutions may in fact be inadequate for the next generations of telecommunication networks, such as 5G or beyond. For example, in the protocol layers, congestion control (also sometimes referred to as flow control herein) could be solved at respective protocol layers, such as TCP (i.e., at Layer 4). Local Area Network switches could operate at link layer and provide pause signaling mechanisms to complement end-to-end flow control. However, for the new proposed 5G architecture, none of these functions would work in an optimal manner and would typically not work at the Internet Protocol (IP) Layer (i.e., Layer 3). Hence, new congestion control mechanisms are desired.

In order to give context to the embodiments described throughout this disclosure, reference is now made to FIG. 1 which schematically shows an example of a midhaul architecture for a 5G RAN architecture. As can bee seen from FIG. 1, the midhaul architecture may comprise several different network nodes, such as Base Band Units (BBU), Routers, and Packet Processing Units (PPU). In the 5G RAN architecture, BBUs and PPUs may be operatively connected over the midhaul using high speed links. The transport efficiency should advantageously be high and latency is typically required to be low. As a consequence, efficient flow control and overload protection is generally important in the transport part (a.k.a. the midhaul part) of the network, i.e. in the transport network, in order to keep the transport latency and buffer usage at low, or acceptable, levels. In the distributed 5G RAN architecture, the congestion domain is typically between BBUs and PPUs.

As can be seen in FIG. 1, the 5G RAN architecture may also comprise a Radio Control Unit (RCU). The RCU may have a S1-AP interface. S1-AP is an abbreviation for S1 Application Protocol. S1-AP provides the signaling service between E-UTRAN and the evolved packet core (EPC). As can also be seen in FIG. 1, the PPU may have a S1-u interface. S1-AP and S1-u per se are known among practitioners in the art and will therefore not be further detailed herein.

In the 5G RAN architecture, the midhaul transport resources are not unlimited and this may result in overload of the midhaul at different points (e.g., network nodes such as BBUs and/or PPUs and/or Routers) in the transport network. In other words, there are many potential bottlenecks where congestion may occur.

For example, the congestion may occur between BBUs and PPUs. One potential challenge might become the many acknowledgement (ACK) and non-acknowledgement (NACK) messages that are communicated over the midhaul between the BBUs and PPUs. The present disclosure recognizes the fact that, in today's Long Term Evolution (LTE) evolved NodeB (eNB) deployment, the Radio Link Control (RLC) and Packet Data Convergence Protocol (PDCP) are co-located and any ACK and/or NACK signaling between the protocol layers is typically very fast. However, the split of the RLC into the BBU and the PDCP into the PPU in the 5G RAN architecture will most likely introduce latency. At the same time the new transport network (i.e., the midhaul) between the BBU and PPU may introduce uncontrolled characteristics, like latency capacity and packet dropping.

It is in view of the above considerations and others that the various embodiments disclosed herein have been made.

As will be appreciated, some existing solutions for congestion control may be inadequate, especially in the next generations (e.g., 5G or beyond) of telecommunication networks. This disclosure recognizes that there is a need for a solution that allows for improved congestion control.

Accordingly, it is a general object of the embodiments of the present invention to allow for improved congestion control. It would be advantageous if the risk for congestion is limited, e.g. reduced or minimized. It would be particularly advantageous to provide embodiments that allow for a suitable congestion control in a fifth or future generation telecommunications network. Furthermore, it would be advantageous if the solution is backwards compatible with earlier generation telecommunications networks, such as Long Term Evolution (LTE) or LTE Advanced.

In a first aspect, this disclosure concerns a method of congestion control in a transport network (a.k.a. midhaul). The method is performed by a first network node. The first network node may advantageously, but not necessarily, be a network node configured for a fifth or subsequent generation telecommunication network. Sometimes, the first network node may be referred to as a detection point throughout this disclosure. Sometimes a detection point may alternatively be referred to as an overload point.

A buffer state of a buffer is monitored by dynamically sampling the buffer such that the sampling rate is adjusted in dependence of the buffer state. For example, the buffer may be a buffer which is part of the first network node. As will be appreciated, it is not necessary that the buffer is a buffer that is part of the first network node. The buffer may alternatively be external to the first network node. Nevertheless, in advantageous embodiments the buffer is integral with the first network node.

Furthermore, a condition indicative of congestion is determined in response to a change of the buffer state exceeding a predetermined limit.

In response to determining the condition indicative of congestion, a congestion notification message is created, or otherwise generated. The congestion notification message includes a combination of: (1) a flow identifier, and (2) back-off information.

The flow identifier may identify at least one flow that contributes to congestion. The back-off information may indicate a suitable back-off to compensate for the congestion caused by the at least one flow associated with its corresponding flow identifier.

The back-off information may include one or more of the following parameters: back-off rate, back-off time, and ramp-up time.

Furthermore, the flow identifier may include a Packet Data Conversion Protocol (PDCP) Flow Identification (FID). Alternatively, the flow identifier may include a PDCP Group FID. Alternatively, the flow identifier may include a PDCP Multicast Group FID.

Additionally, the flow identifier may comprise an IP address associated with the first network node.

Still further, the created congestion notification message is sent, i.e. transmitted, to a second network node. Sometimes, the second network node may be referred to as a reaction point throughout this disclosure. Sometimes a reaction point may alternatively be referred to as a balance point.

In some embodiments, the earlier-mentioned buffer state is the buffer fill level and the change of the buffer state is a change of the buffer fill level. The method may comprise monitoring the buffer fill level and determining the condition indicative of congestion in response to the buffer fill level exceeding the predetermined limit.

In alternative embodiments, the earlier-mentioned buffer state is a buffer change rate at which the buffer changes and the change of the buffer state is a change of the buffer change rate. The method may comprise monitoring the rate at which the buffer state changes and determining the condition indicative of congestion in response to said buffer change rate exceeding the predetermined limit. In one embodiment, the buffer change rate is a buffer fill rate at which the buffer fills and the buffer change rate is a buffer fill rate. The method may comprise monitoring the rate at which the buffer state fills and determining the condition indicative of congestion in response to said buffer fill rate exceeding the predetermined limit.

In still other embodiments, it is conceivable to combine the above-mentioned embodiments of monitoring a buffer fill level and a rate at which the buffer fills, respectively.

In a second aspect, this disclosure concerns a corresponding method of congestion control in a transport network (a.k.a. midhaul). The method is performed by a second network node. The second network node may advantageously, but not necessarily, be a network node configured for a fifth or subsequent generation telecommunication network. Sometimes, the second network node may be referred to as a reaction point throughout this disclosure. The second network node may sometimes be referred to as a reaction point throughout this disclosure. Sometimes a reaction point may alternatively be referred to as a balance point.

A congestion notification message is received from a first network node.

The congestion notification message includes a combination of: (1) a flow identifier, and (2) back-off information.

The flow identifier may identify at least one flow that contributes to congestion. The back-off information may indicate a suitable back-off to compensate for the congestion caused by the at least one flow associated with its corresponding flow identifier.

The back-off information may include one or more of the following parameters: back-off rate, back-off time, and ramp-up time.

Furthermore, the flow identifier may include a Packet Data Conversion Protocol (PDCP) Flow Identification (FID). Alternatively, the flow identifier may include a PDCP Group FID. Alternatively, the flow identifier may include a PDCP Multicast Group FID.

Additionally, the flow identifier may comprise an IP address associated with the first network node.

Still further, one or more parameters are adjusted on the basis of said back-off information.

In a third aspect, this disclosure concerns computer program, comprising instructions which, when executed on at least one processor, cause the at least one processor to carry out the method according to either one or both of the above-described first and second aspects.

Furthermore, a carrier comprising said computer program may be provided. The carrier may, for example, be one of an electronic signal, an optical signal, a radio signal, or a computer readable storage medium.

In a fourth aspect, this disclosure concerns a first network node for congestion control in a transport network. The first network node is configured to perform the method according to the earlier-described first aspect.

The first network node comprises: means adapted to monitor a buffer state of a buffer by dynamically sampling the buffer such that the sampling rate is adjusted in dependence of the buffer state of the buffer; means adapted to determine a condition indicative of congestion in response to a change of the buffer state exceeding a predetermined limit; means adapted to create a congestion notification message in response to determining the condition indicative of congestion, the congestion notification message including a combination of: (1) a flow identifier; and (2) back-off information; and means adapted to transmit the congestion notification message to a second network node.

In one example implementation, the first network node comprises a transmitter, a processor, and a memory. For example, the memory may store computer program with instructions, which when executed on the processor, causes the first network node to monitor a buffer state of a buffer by dynamically sampling the buffer such that the sampling rate is adjusted in dependence of the buffer state of the buffer; determine a condition indicative of congestion in response to a change of the buffer state exceeding a predetermined limit; in response to determining the condition indicative of congestion, create a congestion notification message including a combination of: (1) a flow identifier, and (2) back-off information; and transmit, by means of the transmitter, the congestion notification message to a second network node.

In another example implementation, the first network node comprises a first module configured to monitor a buffer state of a buffer by dynamically sampling the buffer such that the sampling rate is adjusted in dependence of the buffer state; a second module configured to determine a condition indicative of congestion in response to a change of the buffer state exceeding a predetermined limit; a third module configured to create a congestion notification message in response to determining the condition indicative of congestion, the congestion notification message including a combination of: (1) a flow identifier; and (2) back-off information; and means adapted to transmit the congestion notification message to a second network node.

In a fifth aspect, this disclosure concerns a second network node for congestion control in a transport network. The second network node is configured to perform the method according to the second aspect.

The second network node comprises means adapted to receive, from a first network node, a congestion notification message, wherein the congestion notification message includes a combination of (1) a flow identifier and (2) back-off information; and means adapted to adjust one or more parameters on the basis of said back-off information.

In one example implementation, the second network node comprises a receiver, a processor, and a memory. For example, the memory may store computer program with instructions, which when executed on the processor, causes the second network node to receive, by means of the receiver, a congestion notification message from a first network node, wherein the congestion notification message includes a combination of (1) a flow identifier and (2) back-off information; and to adjust one or more parameters on the basis of said back-off information.

In another example implementation, the second network node comprises a receiver configured to receive a congestion notification message from a first network node, wherein the congestion notification message includes a combination of (1) a flow identifier and (2) back-off information, and a first module configured to adjust one or more parameters on the basis of said back-off information.

The various embodiments described herein allow for a novel mechanism for congestion control which may be particularly suitable and/or useful for a 5G RAN architecture.

By the provision of buffer state monitoring by dynamically sampling the buffer it is made possible to improve the congestion control. A first network node (a.k.a. detection point) creates a congestion notification message in response to determining a condition indicative of congestion. This congestion notification message is transmitted to one or several second network nodes (a.k.a. reaction points). Based on the received congestion notification message, the one or several second network nodes may compensate for a detected congestion by adjusting one or more of its parameters based on received back-off information including e.g. suggested back-off time, suggested back-off rate, and/or suggested ramp-up time. Hence, a second network node may adjust i) the time during which it performs back-off, ii) the rate at which back-off is performed, and/or iii) the ramp-up time for the back-off. Upon adjusting one or more of its parameters, it is possible for the second network node to adaptively adjust its behavior in dependence of a condition indicative of congestion detected by any first network node in the network. This way it is for example possible to adaptively reduce PDCP transmissions/retransmissions in the network at appropriate times. As a result, the transport network may operate more efficiently. As a result, also the user experience may be improved.

BRIEF DESCRIPTION OF DRAWINGS

These and other aspects, features and advantages will be apparent and elucidated from the following description of various embodiments, reference being made to the accompanying drawings, in which:

FIGS. 4A-4B illustrate examples in an IPv6 and a IPv4 environments, respectively.

DETAILED DESCRIPTION

Figure 1:
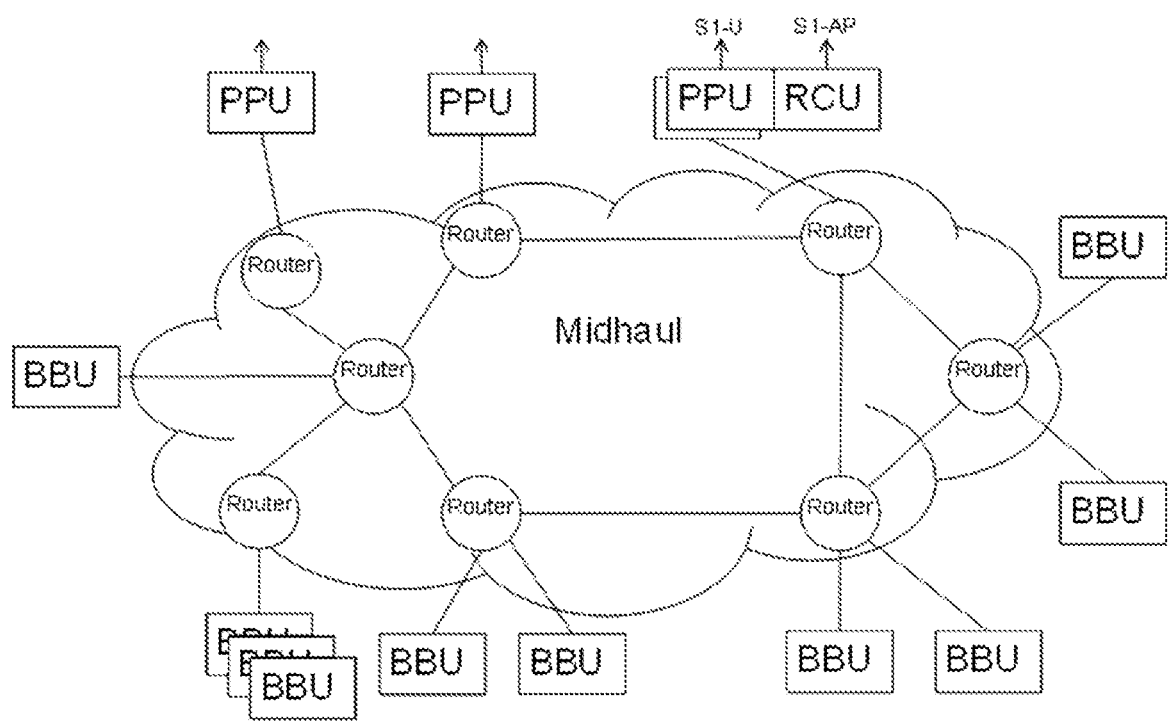
FIG. 1 illustrates an example of a midhaul architecture.

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the present invention to those persons who are skilled in the art. Like reference numbers refer to like elements throughout the description.

As described above, some existing solutions for congestion control (also sometimes known as flow control) may be inadequate, especially in the next generations (e.g., 5G or beyond) of telecommunication networks. This disclosure recognizes that there is a need for a solution that allows for improved congestion control.

Accordingly, it is a general object of the embodiments of the present invention to allow for improved congestion control.

To address this, in accordance with an embodiment, described herein is a system for congestion control in a transport network. The system comprises a first network node (a.k.a. detection point) and at least one second network node (a.k.a. reaction point). The first network node monitors a buffer state of a buffer, e.g. a buffer which is integral with the first network node. Advantageously, the buffer is dynamically sampled such that the sampling rate is adjusted in dependence of the buffer state. Furthermore, the first network node determines, or otherwise detects, a condition indicative of congestion in response to a change of the buffer state exceeding a predetermined limit. In response to determining the condition indicative of congestion, the first network node creates a congestion notification message including a combination of: (1) a flow identifier and (2) back-off information. Still further, the first network node transmits the congestion notification message to at least one second network node. The at least one second network node receives this congestion notification message. Accordingly, the at least one second network node may, as a result, adjust one or more parameters on the basis of said back-off information.

The provision of buffer state monitoring, e.g., by dynamically sampling the buffer state makes it possible to improve the congestion control. The first network node creates a congestion notification message in response to determining the condition indicative of congestion. This congestion notification message is transmitted to one or several second network nodes. Based on the received congestion notification message, the one or several second network nodes may compensate for a detected congestion by adjusting one or more of their parameters based on received back-off information including e.g. suggested back-off time, back-off rate, ramp-up time. Upon adjusting one or more of their parameters, it is possible for a second network node to adaptively adjust its behavior in dependence of a condition indicative of congestion detected by any first network node in the network. This way it is, for example, possible to dynamically reduce PDCP transmissions and/or retransmissions that would otherwise occur more frequently throughout the network. As a result, the transport network will operate more efficiently. As a further consequence, the user experience will thus also be improved.

Figure 2A:
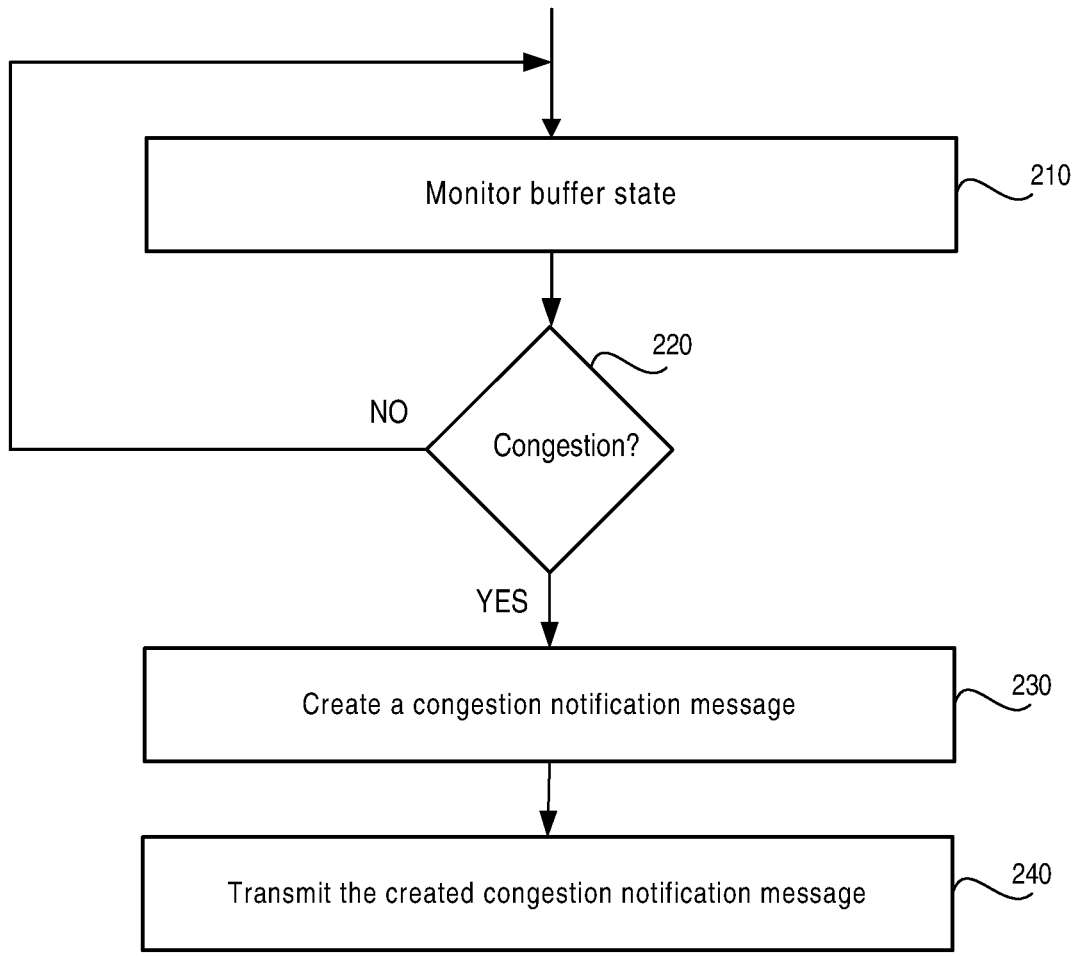
FIGS. 2A-2C are flowcharts of a method according to an embodiment.
Figure 2B:
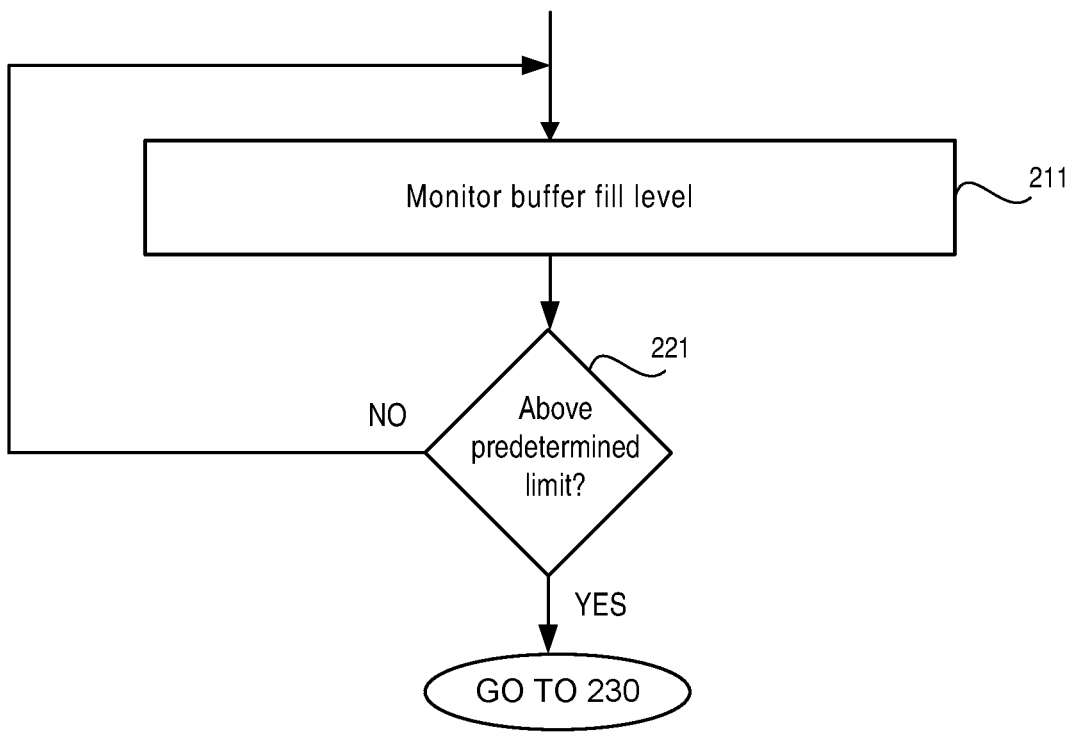
Figure 2C:
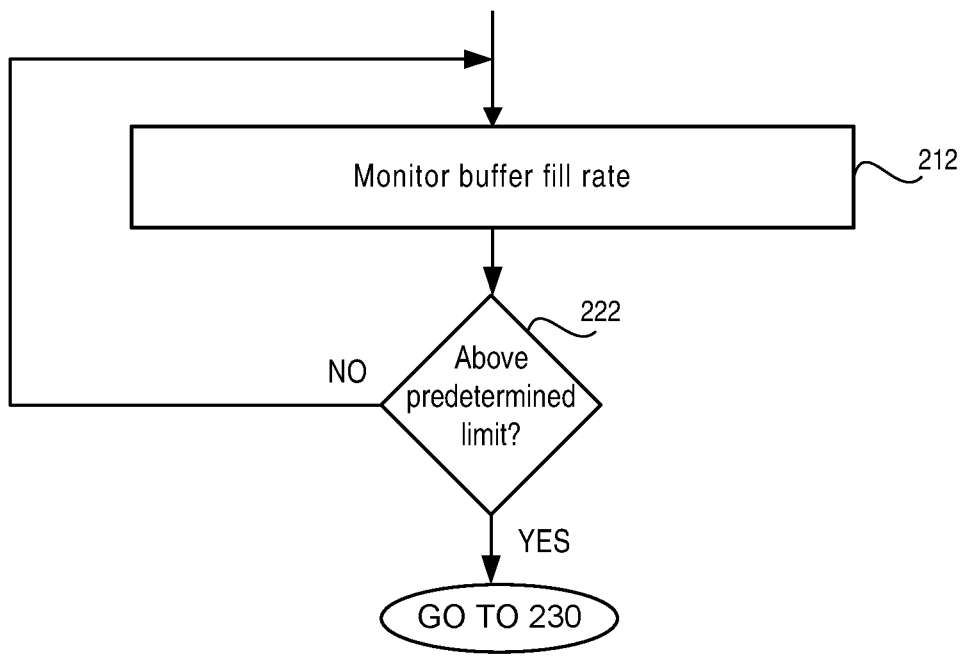

With reference to FIG. 2 A-C, a method according to one example embodiment will be described in further detail. FIG. 2A-C illustrates a method of congestion control in a transport network. The method is performed by a first network node. This first network node is advantageously a network node that is configured for a fifth or subsequent generation telecommunication network.

As can be seen in FIG. 2A, a buffer state of a buffer is monitored 210. For example, the buffer may be a buffer which is part of the first network node. In some embodiments, the buffer is thus integral with the first network node. As will be appreciated, it is not necessary that the buffer is part of the first network node. In alternative embodiments, the buffer may be external to the first network node.

In advantageous embodiments, the monitoring 210 comprises dynamically sampling the buffer such that the sampling rate is adjusted in dependence of the buffer state.

Furthermore, a condition indicative of congestion is determined 220 in response to the buffer state exceeding a predetermined limit. The exact level, or value, of this predetermined limit should be tested and evaluated in each specific case, e.g. in view of system requirements and/or user demands.

In one embodiment, which is schematically illustrated in FIG. 2B, the earlier-mentioned buffer state may be a buffer fill level. Hence, the buffer fill level may be monitored 211. Also, the condition indicative of congestion may be determined 221 in response to the buffer fill level exceeding the predetermined limit.

In an alternative embodiment, which is schematically illustrated in FIG. 2C, the earlier-mentioned buffer state may be a buffer change rate at which the buffer changes. Hence, the rate at which the buffer changes may be monitored 212. Also, the condition indicative of congestion may be determined 222 in response to said buffer change rate exceeding the predetermined limit. For example, the buffer change rate is advantageously a buffer fill rate at which the buffer fills and the buffer change rate is a buffer fill rate. Accordingly, the rate at which the buffer fills may be monitored 212. Also, the condition indicative of congestion may be determined 222 in response to said buffer fill rate exceeding the predetermined limit.

In still other embodiments, which are not illustrated in the drawings, it is conceivable to combine the above-mentioned embodiments of monitoring 211, 212 a buffer fill level and a rate at which the buffer changes, respectively.

Figure 3A:
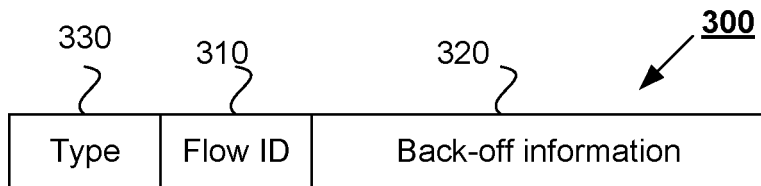
FIGS. 3A-3D illustrate example embodiments of a congestion notification message.

In response to determining the condition indicative of congestion (cf, YES in FIG. 2A), a congestion notification message 300 is created, or otherwise generated. As can be seen in FIG. 3A, this congestion notification message 300 includes at least a combination of: (1) a flow identifier 310, and (2) back-off information 320. Optionally, the congestion notification message 300 may also include a data field 330 indicating the message type, i.e. a congestion notification message.

The flow identifier 310 may identify at least one flow that contributes to congestion. The back-off information 320 may indicate a suitable back-off to compensate for the congestion caused by the at least one flow associated with the corresponding flow identifier 310.

Figure 3B:
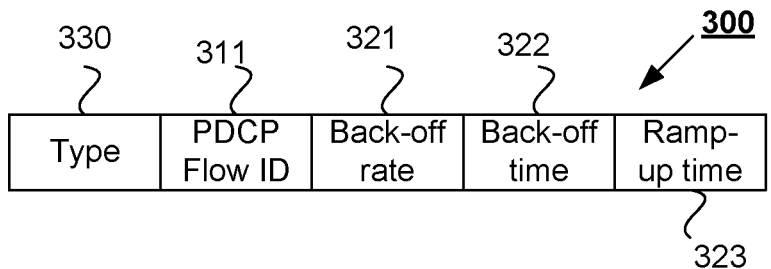

FIG. 3B schematically illustrates a first example implementation of the congestion notification message 300 shown in FIG. 3A. As can be seen in FIG. 3B, the back-off information 320 may in some embodiments include one or more of the following parameters: back-off rate 321, back-off time 322, and ramp-up time 323. Furthermore, the flow identifier 310 may include a Packet Data Conversion Protocol (PDCP) Flow Identification (FID) 311. In the example implementation shown in FIG. 3B, the Type field defines that this is a PDCP Flow ID notification message. The PDCP Flow-ID field identifies the specific flow using the following flow ID variant: PDCP Flow ID (PDCP-FID). The back-off rate 321 may comprise information about how much a second network node shall back-off. This is typically, but not necessarily, expressed in terms of rate (e.g., bandwidth) and may e.g. be an explicit rate number or described as a percentage back-off from the instantaneously used bandwidth. The back-off time 322 may comprise information about how long the back-off should be performed. This is typically, but not necessarily, expressed in terms of time (e.g., seconds). The ramp-up time 323 may comprises information about how fast the ramp-up should be, e.g., the shortest allowed time (e.g., in seconds) to get back to previous used rate (bandwidth). The back-off rate 321, back-off time 322 and ramp-up time 323 timer parameter values may all vary from 0 (zero), which is a special case, and up to an (in principle) unlimited value, which is also a special case.

Figure 3C:
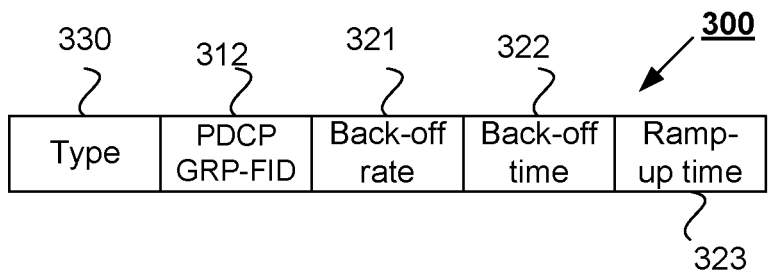

FIG. 3C schematically illustrates a second example implementation of the congestion notification message 300 shown in FIG. 3A. As can be seen in FIG. 3C, the flow identifier may include a PDCP Group Flow Identification 312.

Figure 3D:
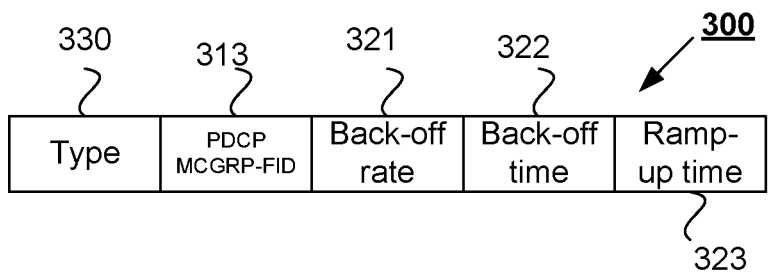

FIG. 3D schematically illustrates a third example implementation of the congestion notification message 300 shown in FIG. 3A. As can be seen in FIG. 3D, the flow identifier may include a PDCP Multicast Group Flow Identification 313.

With continued reference to FIG. 2, the created congestion notification message 300 is also sent 240, i.e. transmitted, to a second network node. As will be appreciated, the congestion notification message 300 may be sent 240 to a single second network node, e.g. using congestion notification message 300 as illustrated in FIG. 3B. Alternatively, the congestion notification message 300 may be sent 240 to a group of several second network nodes, e.g. using congestion notification message 300 as illustrated in FIG. 3C. In still other embodiments, it is possible to send 240 a multicast message, e.g. using congestion notification message 300 as illustrated in FIG. 3D.

With reference to FIGS. 4A and 4B, it should be understood that the PDCP FID:s described hereinabove (e.g., PDCP-FID, PDCP-GRP-FID, PDCP-MCGRP-FID) may in some embodiments be carried by different protocols and in different ways. FIG. 4A shows an example in Internet Protocol version 6, IPv6. FIG. 4B shows an example in Internet Protocol version 4, IPv4.

Figure 5:
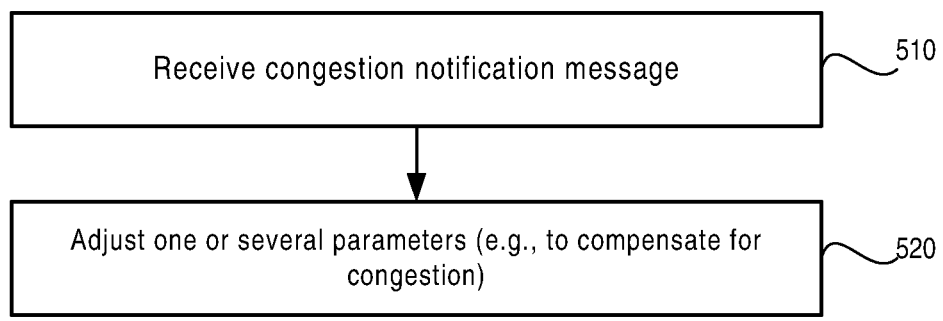
FIG. 5 is a flowchart of a method according to an embodiment.

Reference is now made to FIG. 5, which schematically illustrates a flowchart of a corresponding method performed by a second network node. This second network node is advantageously a network node that is configured for a fifth or subsequent generation telecommunication network.

As can be seen in FIG. 5, a congestion notification message 300 is received 510 from a first network node. As can be seen in FIGS. 3A-3D, the congestion notification message 300 includes a combination of a flow identifier 310 identifying a flow that contributes to congestion and, also, back-off information 320 indicating a suitable back-off to compensate for the congestion caused by the flow associated with said flow identifier. Furthermore, one or more parameters are adjusted 520, or otherwise changed, on the basis of said back-off information.

The various embodiments described herein may be applied in different ways. For example, the congestion control may be provided at IP level, managing IP flow control for PDCP over the midhaul of a 5G RAN. The congestion control described in this disclosure may be seen as comprising three main parts, or functions:
1. Detection point (i.e. the first network node): the point where congestion is detected and congestion notification messages are sent from. It should be appreciated that any intermediate IP router may also be a detection point.
2. Reaction point (i.e., the second network node(s)): the points where the action is taken on congestion based on received congestion notification message. It should be appreciated that any intermediate IP router may also be a reaction point.

3. Congestion Notification Messages: The messages sent between detection points and the reaction points, informing the reaction points of congestion and including back-off information to assist reaction points in compensating for a detected congestion.

In some embodiments and for traffic in the PDCP domain, the PDCP flow(s) may be marked with PDCP Flow ID (PDCP-FID, single PDCP flow) and/or (PDCP-GRP-FID, for PDCP group flows), which may for instance be encoded into the IP flow ID header (IPv6), or in a separate IP option, or any kind of protocol header.

When the detection point identifies congestion it may also detect the flow(s) that consume most of the bandwidth. This may, e.g., be performed by identifying the packets that are consuming most of the buffer or, alternatively, by flow sampling statistics. The detection point will then send a notification message to the reaction point, e.g. using the source IP-address and PDCP-FID/PDCP-GRP-FID of the identified flow(s). In case of sending the message to multiple reaction points at the same time, multicast may be used as an alternative. In the latter case, a Multicast PDCP group notification FID (PDCP-MCGRP-FID) may be used. This may be utilized in both downlink and uplink direction. As described earlier, the congestion notification message 300 may include back-off information 320 such as information of time to pause sending and/or level of back off.

In some embodiments, it is possible to use or otherwise utilize "watermarks". The working principle of a detection point may then be as follows. The water marks in each Quality-of-Service (QoS) queue is checked together with the related Source IP-address including PDCP-FID and/or PDCP-GRP-FID. The sampling of the buffer is dynamic, meaning that when there is high buffer occupation the sampling rate is increased and when the buffer occupation is low the sampling rate is lower. When the watermark is passed, the detection point may send a congestion notification message to the reaction point identified by IP-address and related PDCP-FID and/or PDCP-GRP-FID. When multicast is used the detection point may send to the multicast source specific IP group and may use the related PDCP-MCGRP-FID. As described earlier, the congestion notification message may for example comprise information on i) how much (expressed as rate) the reaction point(s) should back off, ii) for how long time (expressed in time) the reaction point(s) should back off and iii) the ramp-up time after a back-off. For further details with respect to the congestion notification messages, see FIGS. 3A-3D.

A dynamical sampling makes it possible to adaptively adjust, or otherwise change, the sampling rate. For example, when the traffic intensity is low and thus a buffer fill level is low, the sampling rate may also be adjusted to be low as there is typically no (or, little) need for detailed flow information. Furthermore, when the traffic intensity is low it may be advantageous to reduce the sampling rate as this will also limit the usage of processing resources and power. However, when the traffic intensity increases the sampling rate may also be adjusted to increase, e.g., to make it easier to identify the flow(s) that is/are consuming most bandwidth.

In the reaction point(s), the flow(s) may be identified by the PDCP-FID and/or PDCP-GRP-FID and/or PDCP-MCGRP-FID. For example, the reaction point(s), the information received in the notification message may be used to adapt the PDCP scheduler and/or buffer allocation. This may reduce the total bandwidth that is consumed from the reaction point(s) towards the detection point node.

Figure 6:
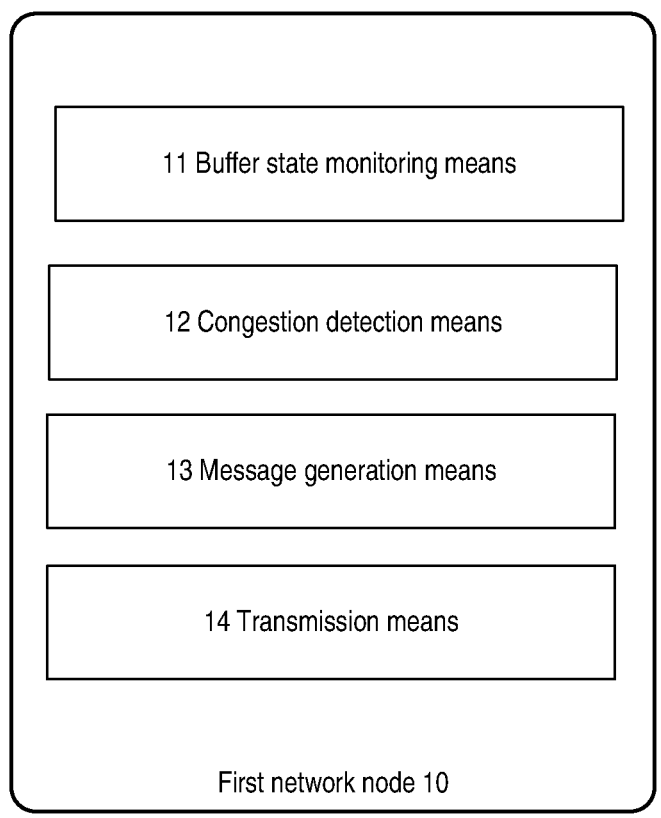
FIG. 6 illustrates an example embodiment of a first network node.

Reference is now made to FIG. 6, which illustrates an example embodiment of a first network node 10. The first network node is configured to perform, or otherwise carry out, any of the methods described with reference to FIGS. 2A-2C. The first network node 10 is advantageously a network node configured for a 5G or subsequent generation telecommunications network.

The first network node 10 is suitable for congestion control, a.k.a. flow control, in a transport network. As can be seen in FIG. 6, the first network node 10 comprises means 11 adapted to monitor a buffer state of a buffer by dynamically sampling the buffer such that the sampling rate is adjusted in dependence of the buffer state. Furthermore, means 12 are provided to determine a condition indicative of congestion in response to a change of the buffer state exceeding a predetermined limit. Also, means 13 are provided to create a congestion notification message 300 (see FIGS. 3A-3D) in response to determining the condition indicative of congestion. As described earlier, the congestion notification message includes a combination of a flow identifier identifying a flow that contributes to congestion and back-off information indicating a suitable back-off to compensate for the congestion caused by the flow associated with said flow identifier. As also described earlier, the back-off information includes one or more of the following parameters: back-off rate, back-off time, ramp-up time. The flow identifier may e.g. include a PDCP FID, a PDCP Group FID or a PDCP Multicast Group FID. Optionally, the flow identifier may additionally comprise an IP address associated with the first network node. With continued reference to FIG. 6, the first network node 10 additionally comprises means 14 adapted to transmit the congestion notification message to a second network node.

In some embodiments, the buffer state is a buffer fill level and the change of the buffer state is a change of the buffer fill level. Hence, the first network node 10 may comprise means 11 adapted to monitor the buffer fill level as well as means 12 adapted to determine the condition indicative of congestion in response to the buffer fill level exceeding the predetermined limit.

In some embodiments, the buffer state is a buffer change rate at which the buffer changes and the change of the buffer state is a change of the buffer change rate. Hence, the first network node 10 may comprise means 11 adapted to monitor the rate at which the buffer state changes and means 12 adapted to determine the condition indicative of congestion in response to said buffer change rate exceeding the predetermined limit. In one embodiment, the buffer change rate is a buffer fill rate at which the buffer fills and the buffer change rate is a buffer fill rate. Accordingly, the first network node 10 may be provided with means 11 adapted to monitor the rate at which the buffer state fills; and means 12 adapted to determine the condition indicative of congestion in response to said buffer fill rate exceeding the predetermined limit.

Figure 7:
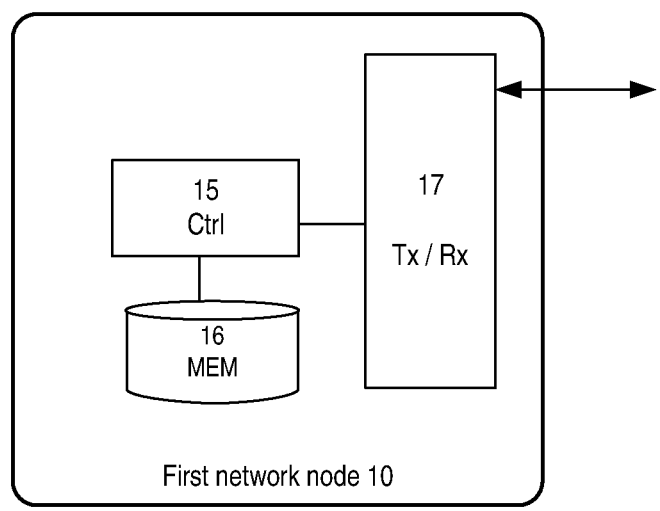
FIG. 7 illustrates an example implementation of the first network node in FIG. 6.

FIG. 7 illustrates an example implementation of the first network node 10 illustrated in FIG. 6. In this example implementation, the first network node 10 comprises a processor 15 and a memory 16. Also, a communications interface 17 may be provided in order to allow the first network node to communicate with other apparatuses (e.g., one or several second network nodes), etc. To this end, the communications interface 17 may comprise a transmitter (Tx) and a receiver (Rx). Alternatively, the communications interface 17 may comprise a transceiver (Tx/Rx) combining both transmission and reception capabilities. The communications interface 17 may include a RF interface allowing the first network node to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

The memory 16 comprises instructions executable by the processor 15 whereby the first network node 10 is operative to:

monitor the buffer state of the buffer by dynamically sampling the buffer such that the sampling rate is adjusted in dependence of the buffer state, determine a condition indicative of congestion in response to a change of the buffer state exceeding a predetermined limit, and create a congestion notification message in response to determining the condition indicative of congestion, wherein the congestion notification message includes the earlier-described combination of: (1) a flow identifier identifying a flow that contributes to congestion; and (2) back-off information indicating a suitable back-off to compensate for the congestion caused by the flow associated with said flow identifier; and transmit, by means of the transmitter, the congestion notification message to a second network node.

In some embodiments, the memory 16 further comprises instructions executable by the processor 15 whereby the first network node 10 is operative to:

monitor the buffer fill level; and determine the condition indicative of congestion in response to the buffer fill level exceeding the predetermined limit.

In some embodiments, the memory 16 further comprises instructions executable by the processor 15 whereby the first network node 10 is operative to:

monitor the rate at which the buffer state changes; and determine the condition indicative of congestion in response to said buffer change rate exceeding the predetermined limit.

In some embodiments, the memory 16 further comprises instructions executable by the processor 15 whereby the first network node 10 is operative to:

monitor the rate at which the buffer state fills; and determine the condition indicative of congestion in response to said buffer fill rate exceeding the predetermined limit.

Figure 8:
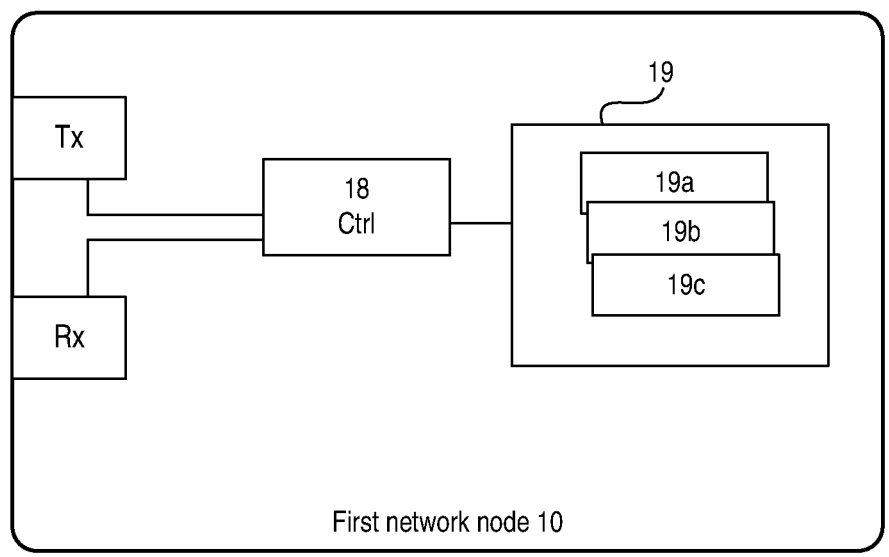
FIG. 8 illustrates an example implementation of the first network node in FIG. 6.

Reference is now made to FIG. 8, which illustrates another example implementation of the first network node 10. In this example implementation, the first network node 10 comprises a processor 18, and one or several modules 19a-c. Also, a communications interface may be provided in order to allow the first network node 10 to communicate with other apparatuses (e.g., one or several second network nodes), etc. To this end, the communications interface may comprise a transmitter (Tx) and/or a receiver (Rx). Alternatively, the communications interface may comprise a transceiver (Tx/Rx) combining both transmission and reception capabilities. The communications interface may include a RF interface allowing the first network node 10 to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

A buffer state monitoring module 19a is configured to monitor the buffer by dynamically sampling the buffer such that the sampling rate is adjusted in dependence of the buffer state. Furthermore, a congestion detection module 19b is configured to determine a condition indicative of congestion in response to a change of the buffer state exceeding a predetermined limit. Still further, a congestion notification message generation module 19c is configured to create or otherwise generate a congestion notification message in response to determining the condition indicative of congestion. As described earlier, the created congestion notification message includes a combination of: (1) a flow identifier identifying a flow that contributes to congestion; and (2) back-off information indicating a suitable back-off to compensate for the congestion caused by the flow associated with said flow identifier. Moreover, a transmitter (Tx) may be configured to transmit the created congestion notification message to one or more second network nodes.

In some embodiments, the buffer state monitoring module 19a is configured to monitor the buffer fill level and the congestion detection module 19b is configured to determine the condition indicative of congestion in response to the buffer fill level exceeding the predetermined limit.

In some embodiments, the buffer state monitoring module 19a is configured to monitor the rate at which the buffer state changes and the congestion detection module 19b is configured to determine the condition indicative of congestion in response to said buffer change rate exceeding the predetermined limit. For example, in one embodiment, the buffer state monitoring module 19a is configured to monitor the rate at which the buffer state fills and the congestion detection module 19b is configured to determine the condition indicative of congestion in response to said buffer fill rate exceeding the predetermined limit.

Figure 9:
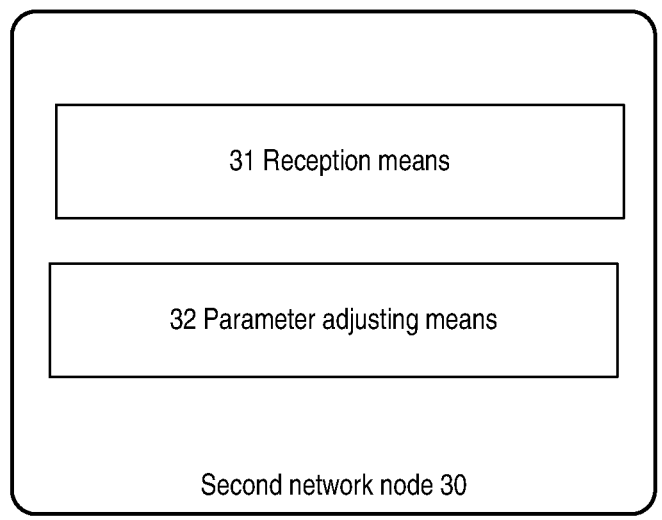
FIG. 9 illustrates an example embodiment of a second network node.

Reference is now made to FIG. 9, which illustrates an example embodiment of a second network node 30. The second network node 30 is configured to perform, or otherwise carry out, any of the method described with reference to FIG. 5. The second network node 30 is advantageously a network node configured for a 5G or a subsequent generation telecommunications network.

The second network node 30 is suitable for congestion control, a.k.a. flow control, in a transport network. As can be seen in FIG. 9, the second network node 30 comprises means 31 adapted to receive, from a first network node, a congestion notification message 300. As described earlier, the congestion notification message 300 includes a combination of: (1) a flow identifier 310 identifying a flow that contributes to congestion and (2) back-off information 320 indicating a suitable back-off to compensate for the congestion caused by the flow associated with said flow identifier. Furthermore, the second network node 30 comprises means 32 adapted to adjust one or more parameters on the basis of said back-off information.

Figure 10:
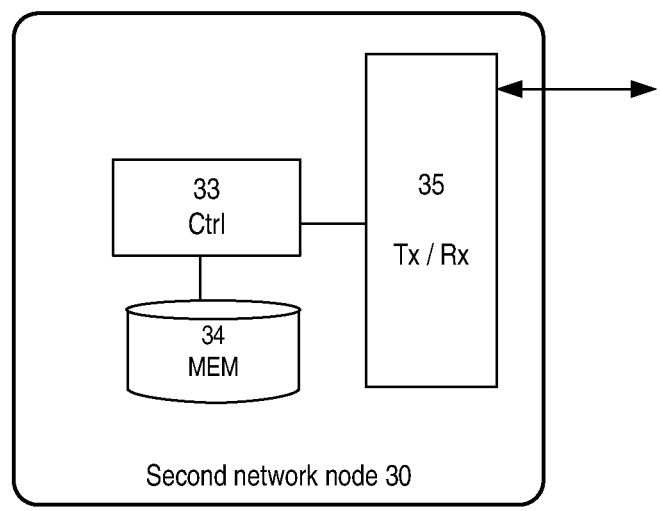
FIG. 10 illustrates an example implementation of the second network node in FIG. 9.

FIG. 10 illustrates an example implementation of the second network node 30 illustrated in FIG. 9. In this example implementation, the second network node 30 comprises a processor 33 and a memory 34. Also, a communications interface 35 may be provided in order to allow the first network node to communicate with other apparatuses (e.g., a first network node), etc. To this end, the communications interface 35 may comprise a transmitter (Tx) and a receiver (Rx). Alternatively, the communications interface 35 may comprise a transceiver (Tx/Rx) combining both transmission and reception capabilities. The communications interface 35 may include a RF interface allowing the first network node to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

The memory 34 comprises instructions executable by the processor 33 whereby the second network node 30 is operative to:

receive (from a first network node) a congestion notification message by means of the receiver 35, wherein the congestion notification message includes said combination of a flow identifier identifying a flow that contributes to congestion and back-off information indicating a suitable back-off to compensate for the congestion caused by the flow associated with said flow identifier; and adjust one or more parameters on the basis of said back-off information.

Figure 11:
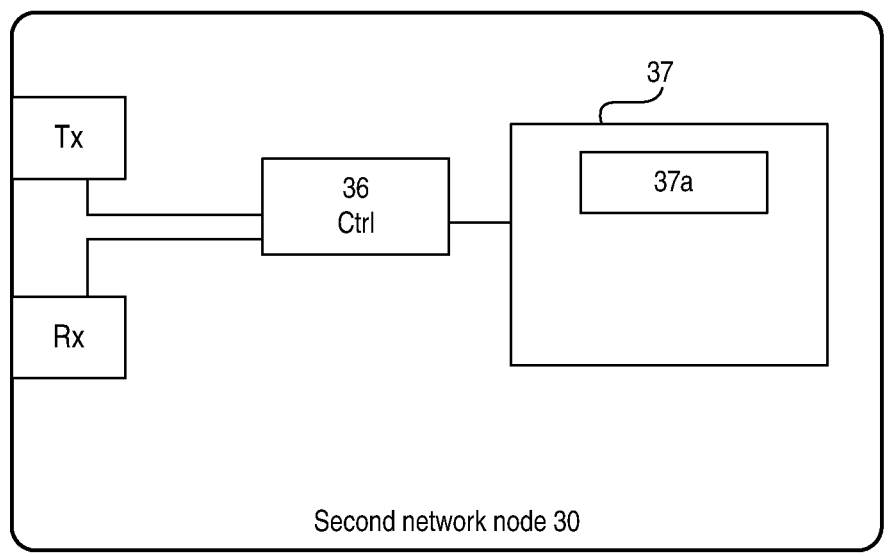
FIG. 11 illustrates an example implementation of the second network node in FIG. 9.

Reference is now made to FIG. 11, which illustrates another example implementation of the second network node 30. In this example implementation, the second network node 30 comprises a processor 36, and one or several modules 37a. Also, a communications interface may be provided in order to allow the second network node 30 to communicate with other apparatuses (e.g., a first network node), etc. To this end, the communications interface may comprise a transmitter (Tx) and/or a receiver (Rx). Alternatively, the communications interface may comprise a transceiver (Tx/Rx) combining both transmission and reception capabilities. The communications interface may include a RF interface allowing the second network node 30 to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

The receiver (Rx) is configured to receive the congestion notification message, wherein the congestion notification message includes said combination of a flow identifier identifying a flow that contributes to congestion and back-off information indicating a suitable back-off to compensate for the congestion caused by the flow associated with said flow identifier. Also, a parameter adjustment module 37a is configured to adjust or otherwise change one or more parameters on the basis of said back-off information.

Figure 12:
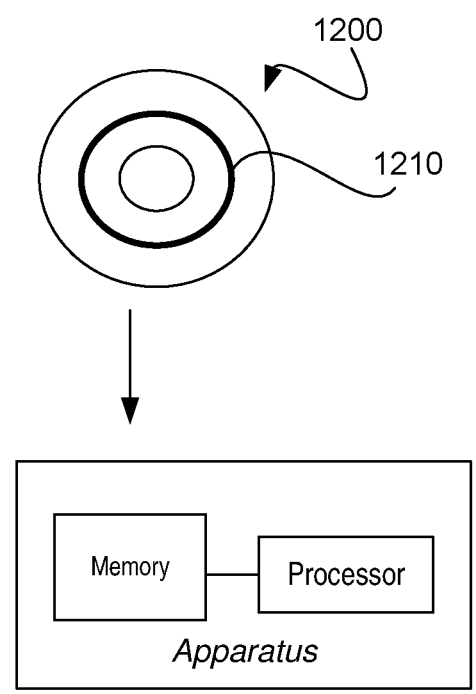
FIG. 12 illustrates a carrier comprising a computer program, in accordance with an embodiment.

FIG. 12 shows an example of a computer-readable medium, in this example in the form of a data disc 1200. In one embodiment the data disc 1200 is a magnetic data storage disc. The data disc 1200 is configured to carry instructions 1210 that can be loaded into a memory of an apparatus. Upon execution of said instructions by a processor of the apparatus, the apparatus is caused to execute a method or procedure according to any one of the methods described in this disclosure. The data disc 1200 is arranged to be connected to or within and read by a reading device (not shown), for loading the instructions into the processor. One such example of a reading device in combination with one (or several) data disc(s) 1200 is a hard drive. It should be noted that the computer-readable medium can also be other mediums such as compact discs, digital video discs, flash memories or other memory technologies commonly used. In such an embodiment the data disc 1200 is one type of a tangible computer-readable medium. The instructions may alternatively be downloaded to a computer data reading device, such as a computer or other apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

The various embodiments described throughout this disclosure are advantageous in that a buffer state may be monitored by dynamically sampling the buffer. Hereby, it is made possible to improve the congestion control. A first network node (a.k.a. detection point) creates a congestion notification message in response to determining a condition indicative of congestion. This congestion notification message is transmitted to one or several second network nodes (a.k.a. reaction points). Based on the received congestion notification message, the one or several second network nodes may compensate for a detected congestion by adjusting one or more of its parameters based on received back-off information including e.g. suggested back-off time, suggested back-off rate, and/or suggested ramp-up time. Hence, a second network node may adjust i) the time during which it performs back-off, ii) the rate at which back-off is performed, and/or iii) the ramp-up time for the back-off. Upon adjusting one or more of its parameters, it is possible for the second network node to adaptively adjust its behavior in dependence of a condition indicative of congestion detected by any first network node in the network. This way it is for example possible to adaptively reduce PDCP transmissions/retransmissions in the network at appropriate times. As a result, the transport network may operate more efficiently. As a result, also the user experience may be improved.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC(s)), and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. As a mere example, it should be appreciated that it is conceivable to use or otherwise utilize several (i.e., two or more) predetermined limits. This way it may for instance be possible to determine different levels of congestion, e.g. from low congestion to high congestion. Also, the back-off information indicating the suitable back-off to compensate for the congestion may be tailored to compensate for said different levels of congestion.

Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different embodiments, these may possibly advantageously be combined, and the inclusion of different numbered embodiments does not imply that a combination of features is not feasible and/or advantageous. In addition, singular references do not exclude a plurality.

The invention claimed is:

1. A method of congestion control in a transport network, the method, being performed by a first network node, comprising:
monitoring a buffer state of a buffer of the first network node by dynamically sampling the buffer such that a sampling rate is adjusted in dependence of the buffer state;
determining a condition indicative of congestion in response to a change of the buffer state exceeding a predetermined limit;
in response to determining the condition indicative of congestion, creating a congestion notification message including a combination of:
a flow identifier identifying a flow that contributes to the congestion;
a back-off rate indicating a suitable back-off to compensate for the congestion caused by the flow associated with said flow identifier;
a back-off time indicating a time length to perform the back-off; and
a ramp-up time indicating how fast to ramp back from the back-off; and
transmitting the congestion notification message to a second network node,
wherein the flow identifier includes at least one of a Packet Data Convergence Protocol (PDCP), Flow Identification (FID), a PDCP Group FID, or a PDCP Multicast Group FID.

2. The method of claim 1, wherein the buffer state is a buffer fill level and the change of the buffer state is a change of the buffer fill level, the method further comprising:
- monitoring the buffer fill level; and
- determining the condition indicative of congestion in response to the buffer fill level exceeding the predetermined limit.

3. The method of claim 1, wherein the buffer state is a buffer change rate at which the buffer changes and the change of the buffer state is a change of the buffer change rate, the method further comprising:
- monitoring the rate at which the buffer state changes; and
- determining the condition indicative of congestion in response to said buffer change rate exceeding the predetermined limit.

4. The method of claim 3, wherein the buffer change rate is a buffer fill rate at which the buffer fills, the method further comprising:
- monitoring the rate at which the buffer fills; and
- determining the condition indicative of congestion in response to said buffer fill rate exceeding the predetermined limit.

5. The method of claim 1, wherein the flow identifier additionally comprises an Internet Protocol (IP) address associated with the first network node.

6. A method of congestion control in a transport network, the method, being performed by a second network node, comprising:
- receiving, from a first network node, a congestion notification message associated with a buffer of the first network node, wherein the congestion notification message includes a combination of:
  - a flow identifier identifying a flow that contributes to congestion;
  - a back-off rate indicating a suitable back-off to compensate for the congestion caused by the flow associated with said flow identifier;
  - a back-off time indicating a time length to perform the back-off; and
  - a ramp-up time indicating how fast to ramp back from the back-off; and
- adjusting one or more parameters on a basis of the congestion notification message,
- wherein the flow identifier includes at least one of a Packet Data Convergence Protocol (PDCP), Flow Identification (FID), a PDCP Group FID, or a PDCP Multicast Group FID.

7. The method of claim 6, wherein the flow identifier additionally comprises an Internet Protocol (IP) address associated with the first network node.

8. A non-transitory computer-readable medium containing instructions which, when executed on at least one processor, cause a first network node to perform operations to control congestion in a transport network comprising:
- monitoring a buffer state of a buffer of the first network node by dynamically sampling the buffer such that a sampling rate is adjusted in dependence of the buffer state;
- determining a condition indicative of congestion in response to a change of the buffer state exceeding a predetermined limit;
- in response to determining the condition indicative of congestion, creating a congestion notification message including a combination of:
  - a flow identifier identifying a flow that contributes to the congestion;
  - a back-off indicating a suitable back-off to compensate for the congestion caused by the flow associated with said flow identifier;
  - a back-off time indicating a time length to perform the back-off; and
  - a ramp-up time indicating how fast to ramp back from the back-off; and
- transmitting the congestion notification message to a second network node,
- wherein the flow identifier includes at least one of a Packet Data Convergence Protocol (PDCP), Flow Identification (FID), a PDCP Group FID, or a PDCP Multicast Group FID.

9. A non-transitory computer-readable medium containing instructions which, when executed on at least one processor, cause a second network node to perform operations to control congestion in a transport network comprising:
- receiving, from a first network node, a congestion notification message associated with a buffer of the first network node, wherein the congestion notification message includes a combination of:
  - a flow identifier identifying a flow that contributes to congestion;
  - a back-off rate indicating a suitable back-off to compensate for the congestion caused by the flow associated with said flow identifier;
  - a ramp-up time indicating how fast to ramp back from the back-off; and
  - a back-off time indicating a time length to perform the back-off; and
- adjusting one or more parameters on a basis of the congestion notification message,
- wherein the flow identifier includes at least one of a Packet Data Convergence Protocol (PDCP), Flow Identification (FID), a PDCP Group FID, or a PDCP Multicast Group FID.

10. A first network node for congestion control in a transport network, the first network node comprising:
- a processor; and
- a memory containing instructions which, when executed by the processor, cause the first network node to perform operations to:
  - monitor a buffer state of a buffer of the first network node by dynamically sampling the buffer such that a sampling rate is adjusted in dependence of the buffer state;
  - determine a condition indicative of congestion in response to a change of the buffer state exceeding a predetermined limit;
  - create a congestion notification message in response to determining the condition indicative of congestion, the congestion notification message including a combination of:
    - a flow identifier identifying a flow that contributes to the congestion;
    - a back-off rate indicating a suitable back-off to compensate for the congestion caused by the flow associated with said flow identifier;
    - a back-off time indicating a time length to perform the back-off; and
    - a ramp-up time indicating how fast to ramp back from the back-off; and
  - transmit the congestion notification message to a second network node, wherein the flow identifier includes at least one of a Packet Data Convergence Protocol, PDCP, Flow Identification, FID, a PDCP Group FID or a PDCP Multicast Group FID.

11. The first network node of claim 10, wherein the buffer state is a buffer fill level and the change of the buffer state is a change of the buffer fill level, the first network node to further perform operations to:
monitor the buffer fill level; and
determine the condition indicative of congestion in response to the buffer fill level exceeding the predetermined limit.

12. The first network node of claim 10, wherein the buffer state is a buffer change rate at which the buffer changes and the change of the buffer state is a change of the buffer change rate, the first network node to further perform operations to:
monitor the rate at which the buffer state changes; and
determine the condition indicative of congestion in response to said buffer change rate exceeding the predetermined limit.

13. The first network node of claim 12, wherein the buffer change rate is a buffer fill rate at which the buffer fills, the first network node to further perform operations to:
monitor the rate at which the buffer fills; and
determine the condition indicative of congestion in response to said buffer fill rate exceeding the predetermined limit.

14. The first network node of claim 10, wherein the flow identifier additionally comprises an Internet Protocol (IP) address associated with the first network node.

15. A second network node for congestion control in a transport network, the second network node comprising:
a processor; and
a memory containing instructions which, when executed by the processor, cause the second network node to perform operations to:
receive, from a first network node, a congestion notification message associated with a buffer of the first network node, wherein the congestion notification message includes a combination of:
a flow identifier identifying a flow that contributes to congestion;
a back-off rate indicating a suitable back-off to compensate for the congestion caused by the flow associated with said flow identifier;
a back-off time indicating a time length to perform the back-off; and
a ramp-up time indicating how fast to ramp back from the back-off; and
adjust one or more parameters on a basis of the congestion notification message,
wherein the flow identifier (310) includes at least one of a Packet Data Convergence Protocol, PDCP, Flow Identification, FID, a PDCP Group FID or a PDCP Multicast Group FID.

16. The second network node of claim 15, wherein the flow identifier additionally comprises an Internet Protocol (IP) address associated with the first network node.

* * * * *